United States Patent
Karlsson et al.

(10) Patent No.: US 8,364,362 B2
(45) Date of Patent: Jan. 29, 2013

(54) METHOD FOR CLUTCH DISENGAGEMENT BY COMPARING BRAKE PEDAL POSITIONS

(75) Inventors: Svante Karlsson, Västra Frölunda (SE); Erik Lauri, Mölndal (SE)

(73) Assignee: Volvo Lastvagnar AB, Göteborg (SE)

(*) Notice: Subject to any disclaimer, the term of this patent is extended or adjusted under 35 U.S.C. 154(b) by 965 days.

(21) Appl. No.: 12/159,867

(22) PCT Filed: Jan. 5, 2006

(86) PCT No.: PCT/SE2006/000020
§ 371 (c)(1), (2), (4) Date: Jul. 2, 2008

(87) PCT Pub. No.: WO2007/078224
PCT Pub. Date: Jul. 12, 2007

(65) Prior Publication Data
US 2008/0300107 A1    Dec. 4, 2008

(51) Int. Cl.
*G06F 17/00* (2006.01)
(52) U.S. Cl. .......................... 701/68; 477/170
(58) Field of Classification Search .................. 701/67, 701/68, 58; 192/13 R
See application file for complete search history.

(56) References Cited

U.S. PATENT DOCUMENTS

| | | | |
|---|---|---|---|
| 5,277,286 A | 1/1994 | Yamamoto et al. | |
| 6,926,638 B1 * | 8/2005 | Gimmler et al. | 701/97 |
| 2008/0220938 A1 * | 9/2008 | Panagopoulos et al. | 477/86 |

FOREIGN PATENT DOCUMENTS

| | | |
|---|---|---|
| DE | 10101858 A1 | 7/2002 |
| DE | 10220869 A1 | 12/2002 |
| DE | 10316459 A1 | 10/2003 |
| DE | 10346885 A1 * | 5/2005 |

OTHER PUBLICATIONS

European Search Report from corresponding European Application No. 06 700 164.4.
International Search Report from corresponding International Application No. PCT/SE2006/000020.

* cited by examiner

*Primary Examiner* — Gerald McClain
(74) *Attorney, Agent, or Firm* — WRB-IP LLP

(57) ABSTRACT

A method for controlling clutch disengagement in a vehicle having an automated manual transmission including an electronically controlled clutch includes 1. sensing at least two brake pedal positions separated in time, 2. performing a differentiation of the sensed brake pedal positions, 3. comparing the result of the differentiation to a first predetermined threshold value, and 4. controlling the clutch to disengage if the result of the differentiation represents a faster brake pedal application than a predetermined threshold value.

8 Claims, 2 Drawing Sheets

METHOD FOR CLUTCH DISENGAGEMENT BY COMPARING BRAKE PEDAL POSITIONS

BACKGROUND AND SUMMARY

The present invention relates to a method for controlling clutch disengagement in a vehicle having an automated manual transmission comprising an electronically controlled clutch.

As is well known by persons skilled in the art of controlling clutch and gearbox in a vehicle having an automated manual transmission, there is a problem concerning clutch disengagement in panic brake situations, i.e. where an operator of the vehicle maneuvers a brake pedal in order to get an as fast vehicle stop as possible.

In vehicles having a manual transmission, the operator himself/herself controls the clutch disengagement responsive to present circumstances. For example, it is not very beneficial to disengage the clutch for light braking; on the contrary, by keeping the clutch and gearbox engaged, it is possible to let the engine absorb some of the brake energy; by letting the engine absorb energy, brake wear and risk for brake overheating could be reduced.

In some brake situations, it is however desired to have an as fast clutch disengagement as possible; this is desired e.g. in situations requiring a rapid braking of vehicle velocity; at a rapid braking of the vehicle, the engine rotation will have enough inertia to require brake force from the vehicle brakes, which is the opposite situation as compared to the earlier mentioned situation concerning engine braking.

For vehicles comprising an automated manual transmission, i.e. an electronically controlled clutch and gearbox, it is of course beneficial if the above mentioned features could be obtained, but since there is no clutch pedal in such vehicles, the information used to control the clutch must come from other sources.

Presently, this information comes mainly from wheel sensors sensing a rotational speed of the wheels. The signal from the wheel sensors is used to decide whether the clutch should be engaged/disengaged. There is however at least one problem connected with using wheel sensor signals to control clutch disengagement, namely that there is a time delay from actual brake pedal maneuvering and signal arrival. On a slippery surface, the engine may stall if the braking is so hard that the driven wheels are locked and the clutch is not disengaged fast enough. This delay might delay an optimum braking performance of the vehicle.

According to an aspect of the present invention, a method comprises the steps of:
i. sensing at least two brake pedal positions separated in time,
ii. performing a differentiation of the sensed brake pedal positions,
iii. comparing the result of the differentiation to a first predetermined threshold value, and
iv. controlling the clutch to disengage if the result of the differentiation represents a faster brake pedal application than a predetermined threshold value.

In a further development of the invention, the steps of:
v. continuously sensing brake pedal position,
vi. continuously comparing the sensed brake pedal position with a second predetermined threshold value, and
vii. controlling the clutch to disengage if the continuously sensed brake pedal position at any time exceeds the second predetermined value,
are added to the method according to the invention.

By the added steps v-vii, the clutch will disengage upon heavy braking, even if the actual brake application is slow.

In a preferred embodiment of the invention, the first predetermined threshold value represents a brake application rate of 15% of maximum applicable brake force in less than 0.1 second.

In another preferred embodiment, the second predetermined threshold value represents 30% of maximum applicable brake force.

BRIEF DESCRIPTION OF THE DRAWINGS

Hereinafter, the invention will be described by means of examples and with reference to the following drawings, FIG. 1, which schematically shows a clutch assembly, wherein the method according to the invention could be used to control disengagement of the clutch assembly, and FIG. 2, which is a flow chart illustrating steps in a method according to an aspect of the present invention.

DETAILED DESCRIPTION

As is well known by persons skilled in the art, a drivetrain in a vehicle having an automated manual transmission includes an engine, a gearbox, and at least one drive-shaft connected to propel the vehicle. The gearbox includes a number of gears giving various gear ratios; a clutch is arranged between the engine and the gearbox to give the possibility to engage and disengage the connection between the gearbox and the engine.

Figure 1:
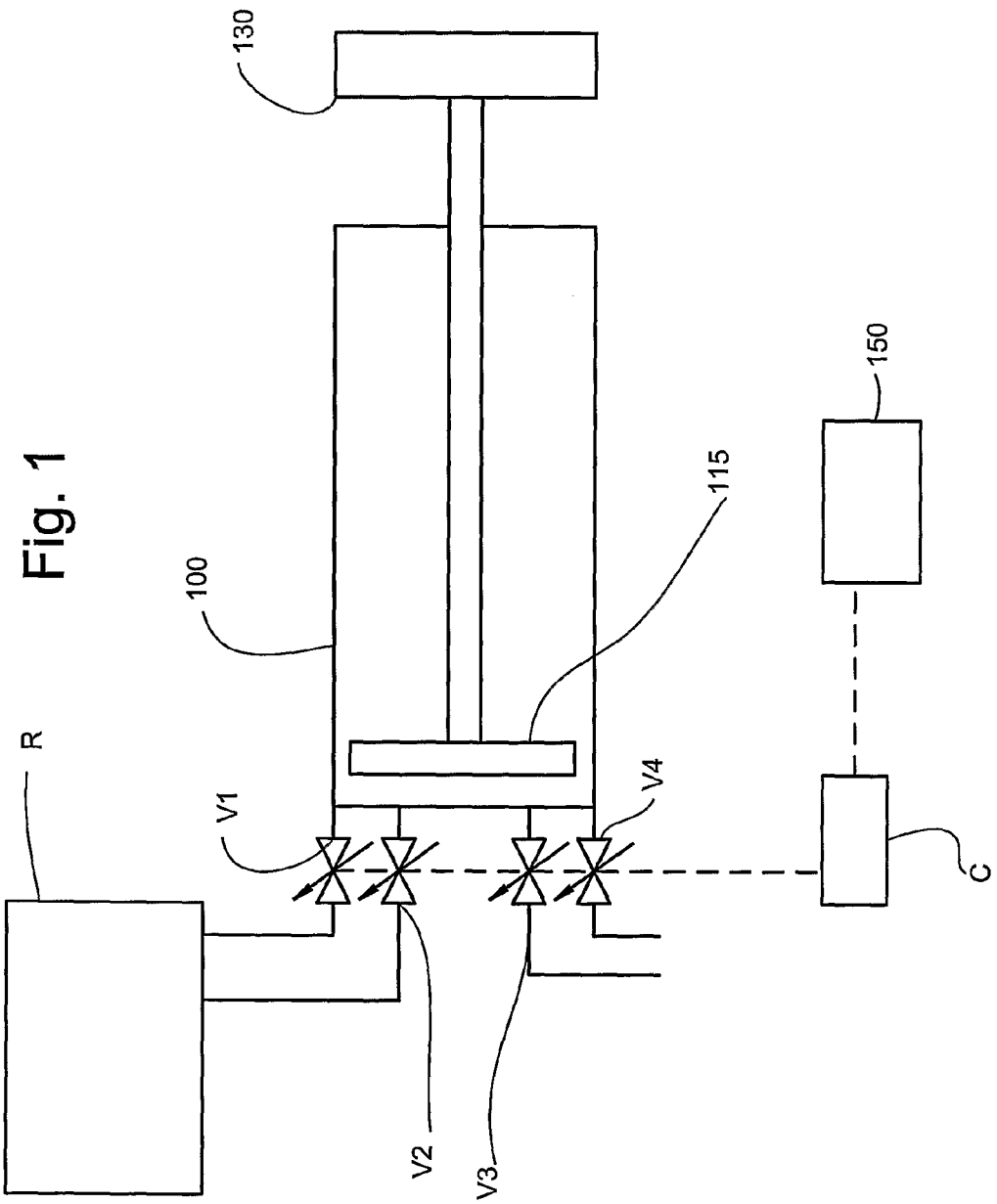

With reference to FIG. 1, a clutch 130 in a heavy duty vehicle, preferably a truck or a bus, is controlled by maneuvering a piston 115, which is connected thereto and reciprocally mounted in a clutch cylinder 100, by opening or closing air supply valves V1 and V2, wherein the air supply valve V1 is a small diameter valve and air supply valve V2 is a large diameter valve. The air supply valves V1 and V2 are adapted to open and close a connection between an air supply R and the clutch cylinder 100.

Upon pressurization, the piston 115 will be forced to the right in FIG. 1, due to air pressure acting on the left side of the piston 115. The piston motion to the right will disengage the clutch 130, i.e. disengage the connection between an engine (not shown) and a gearbox (not shown), which in turn is connected to drive wheels (not shown) arranged to propel the vehicle.

The clutch 130 is in its spring-biased rest position when the clutch is engaged, i.e. the clutch 130 biases the piston 110 to the left in FIG. 1. Hence, the clutch 130 will be engaged upon pressure release of the cylinder space to the left of the piston 115. In order to release pressure from this space, two venting valves V3 and V4, wherein V3 is a small diameter valve and V4 is a large diameter valve, are arranged to vent pressure in the cylinder 100 to the atmosphere.

The valves V1-V4 are controlled by an electronic controller C. The controller can order a fast clutch disengagement by ordering an opening of both the air supply valves V1 and V2 simultaneously, a somewhat slower clutch disengagement by ordering opening of only the large diameter valve V2, and an even slower clutch disengagement by ordering opening of only the small diameter valve V1. An even slower clutch disengagement can be achieved by pulse width modulation or frequency modulation of the opening of the valve V1 or V2.

In a similar manner, clutch engagement can be controlled by selectively opening the valves V3 and V4.

Figure 2:
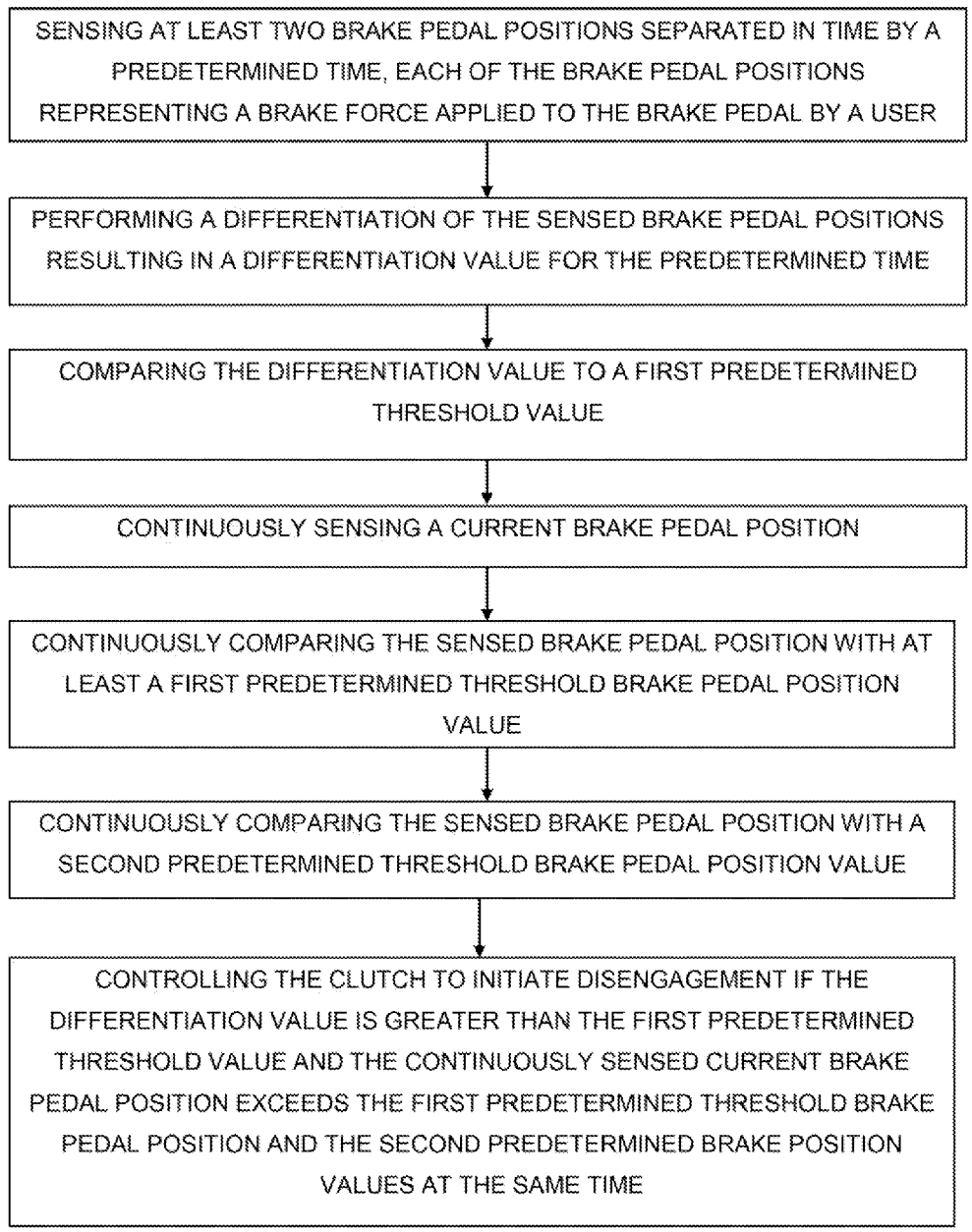

According to an aspect of the invention illustrated by a flow chart shown in FIG. 2, the clutch disengagement could be controlled responsive to a signal from a sensor 150, which is arranged to sense a brake pedal position. The signal could preferably be transferred to the controller or any other signal processing means (not shown).

If the signal is transferred to the controller C, the controller C preferably contains hardware or software to perform a signal processing of the signal from the brake pedal sensor 150, e.g. as follows.

First, the controller performs a differentiation of the signal from the brake pedal sensor as a function of time. The differentiation could be performed in a number of ways; in the most simplified variant, the controller uses the signal from the brake pedal sensor a certain time (e.g. 0, 1 s) after initial brake pedal maneuvering as the differentiation value. Should the differentiation value exceed e.g. 10% of maximum applicable brake force, the controller will control the valves V1 and V2 to open, hence achieving a fast clutch disengagement. The reasoning behind this clutch disengagement is that the controller regards a rapid brake initiation, i.e. a high differentiation value, as a first step towards a fast braking, which benefits from a rapid, and early, clutch disengagement.

If the differentiation value is lower than the e.g. 15% of maximum brake force, there are (at least) three different options for the controller controlling the clutch.

In a first case, wherein the signal from the brake pedal sensor represents a light brake application, e.g. below 5% of maximum applicable brake force, the controller will control the clutch and the gearbox almost the same way it does when the signal from the brake pedal sensor represents no brake application, i.e. disengage the clutch when the engine has reached idling speed, gear down the gearbox, and reengage the clutch until the engine has reached idling speed, when it again will disengage the clutch for a new gear-down of the gearbox, and so on until the gearbox has reached a gear that represents two gearshifts above a starting gear, i.e. the gear used for vehicle take-off (which will vary depending on vehicle load). When the gearbox has reached the gear two numbers above the take-off gear, the controller will disengage the clutch if any brake is applied. If no brake is applied, the controller will allow the vehicle to continue to run on engine idling speed at the gear two numbers above take-off gear. As mentioned earlier, clutch engagement with various rates could be achieved by opening the valves V3 and V4.

In a second case, the signal from the brake pedal sensor 150 represents a "medium" braking, e.g. 5-30% of maximum braking load. Here, the controller will control the clutch to be engaged until the engine has reached idling speed. Thereafter, the controller controls the clutch to disengage, and stay disengaged until the signal from the brake pedal sensor 150 signals that the brake pedal has been at least partly released, e.g. to a force value according to the first case, or until the vehicle has stopped and the gearbox has been put in a neutral position.

In a third case, the brake pedal position represents that a heavy braking action is required, e.g. more than 30% of maximum braking. In this case, the controller will control the clutch to be disengaged, e.g. by opening both or either of the valves V1 and/or V2.

In the first and second cases, i.e. the cases representing brake application from 0-30% of maximum applicable braking force, the clutch disengagement rate could be adapted to give smoothest possible disengagement, e.g. by controlling opening of only one of the valves V1 or V2, which, as mentioned, gives a slower clutch disengagement than opening both valves V1 and V2 simultaneously.

As can be understood, the above described embodiments are only exemplary, many diversions could be made of the described embodiments without departing form the scope of the invention. For example, the differentiation value of the brake position could be calculated continuously, e.g. by streaming a flow of brake pedal position signals to the controller C, wherein each brake pedal position signal is accompanied with a time at which the actual measurement was made. By comparing two neighboring brake pedal positions, and divide the difference between the brake pedal positions by the time between the measurements, a value regarding rate of brake application could be obtained.

The invention claimed is:

1. A method for controlling clutch disengagement in a vehicle having an automated manual transmission comprising a user controlled brake pedal having a brake pedal position and an electronically controlled clutch, comprising:
   sensing at least two brake pedal positions separated in time by a predetermined time,
   performing a differentiation of the sensed brake pedal positions resulting in a differentiation value for the predetermined time,
   comparing the differentiation value to a first predetermined threshold value,
   continuously sensing a current brake pedal position,
   continuously comparing the sensed brake pedal position with at least a first predetermined threshold brake pedal position value,
   continuously comparing the sensed brake pedal position with a second predetermined threshold brake pedal position value, and
   controlling the clutch to initiate disengagement if the differentiation value is greater than the first predetermined threshold value and the continuously sensed current brake pedal position exceeds the first predetermined threshold brake pedal position and the second predetermined threshold brake pedal position values at the same time.

2. The method of claim 1, comprising:
   controlling the clutch to disengage if the continuously sensed current brake pedal position exceeds both the first and second predetermined threshold brake pedal position values.

3. The method of claim 2, comprising:
   controlling the clutch to disengage if the continuously sensed current brake pedal position exceeds only the first but not the second predetermined threshold brake pedal position values and the engine has reached idling speed.

4. The method of claim 3, comprising:
   controlling the clutch to disengage if the continuously sensed current brake pedal position exceeds neither the first nor the second predetermined threshold brake pedal position values, a gearbox of the engine is in a predetermined gear above a starting gear, and the engine has reached idling speed.

5. The method of claim 2, wherein the first predetermined threshold value over the predetermined time represents a brake application rate of 15% of maximum applicable brake three in less than 0.1 second.

6. The method of claim 5, wherein the second predetermined threshold brake position value represents 30% of maximum applicable brake force.

7. The method of claim 2, wherein the second predetermined thresho brake position value represents 30% of maximum applicable brake force.

8. The method of claim 1, wherein the first predetermined threshold value over the predetermined time represents a brake application rate of 15% of maximum applicable brake force in less than 0.1 second.

* * * * *